United States Patent [19]

Hietanen et al.

[11] Patent Number: 4,503,721
[45] Date of Patent: Mar. 12, 1985

[54] VALVE ACTUATOR FOR A DOSING PUMP FOR A PAINT TONING MACHINE

[75] Inventors: Esko Hietanen, Pori; Pentti Airaksinen, Ulvila, both of Finland

[73] Assignee: Oy W. Rosenlew AB, Finland

[21] Appl. No.: 464,917

[22] Filed: Feb. 8, 1983

[30] Foreign Application Priority Data

Feb. 10, 1982 [FI] Finland ................................. 820433

[51] Int. Cl.³ ...................... F16H 21/16; B67D 5/52; A47G 19/12; E03B 5/00
[52] U.S. Cl. .......................................... 74/44; 74/25; 222/135; 222/144.5; 137/565.1; 137/567
[58] Field of Search ............... 74/44, 25, 89; 222/135, 222/144.5, 333; 417/521, 519, 317; 137/565.1, 565.2, 567

[56] References Cited

U.S. PATENT DOCUMENTS

| | | | |
|---|---|---|---|
| 549,251 | 11/1895 | Page | 222/333 |
| 2,032,163 | 2/1936 | Bagby | 417/519 X |
| 2,099,253 | 11/1937 | Bagby | 222/333 |
| 2,796,195 | 6/1957 | Willis et al. | 222/135 X |
| 2,885,119 | 5/1959 | Carriol | 222/135 X |
| 2,951,617 | 9/1960 | Brock | 222/333 X |
| 3,015,415 | 1/1962 | Marsh et al. | 222/333 X |
| 3,134,508 | 5/1964 | Bayer et al. | 222/135 |
| 3,851,798 | 12/1974 | Miller | 222/135 |
| 4,155,490 | 5/1979 | Glenn | 222/333 X |
| 4,234,107 | 11/1980 | Gernlein | 417/519 X |
| 4,273,261 | 6/1981 | Krueger | 222/135 |

FOREIGN PATENT DOCUMENTS 135485 10/1902 Fed. Rep. of Germany .
149524 3/1904 Fed. Rep. of Germany .
369096 8/1974 Sweden .

Primary Examiner—Allan D. Herrmann
Assistant Examiner—Michael J. Gonet
Attorney, Agent, or Firm—Memel, Jacobs, Pierno & Gersh

[57] ABSTRACT

A valve actuator for a dosing pump for a paint toning machine, wherein the dosing pumps (3) are mounted in a sled movable with respect to the frame of the machine and a dosing mechanism (21-24) displacing the pistons (4) of the dosing pumps and an actuator rotating the valves (8) of the dosing pumps are mounted in the frame. The actuator comprises a crank (13) mounted rotatably in the frame and two cam rods (15, 16) which are mounted pivotally in the frame and of which one (15) is located in the path of movement of the crank and the other (16) is provided with a transfer mechanism (26) for transferring the cam rod optionally into and out of the path of movement of the crank. The cam rods are connected to a grab (20) mounted rotatably in the frame so that the pivoting movement of one (15) of the cam rods under the action of the crank causes rotation of the grab to a valve-closing position and the pivoting movement of the other cam rod (16) under the action of the crank causes rotation of the grab to a valve-opening position. When rotating in one direction, the crank (13) is in engagement with a crank-connecting rod means (21, 22) included in the dosing mechanism for dosing toner under the action of the movement of the crank (13) of the valve actuator but is disengaged from the dosing mechanism when rotating in the other direction.

5 Claims, 10 Drawing Figures

U.S. Patent  Mar. 12, 1985  Sheet 1 of 2  4,503,721
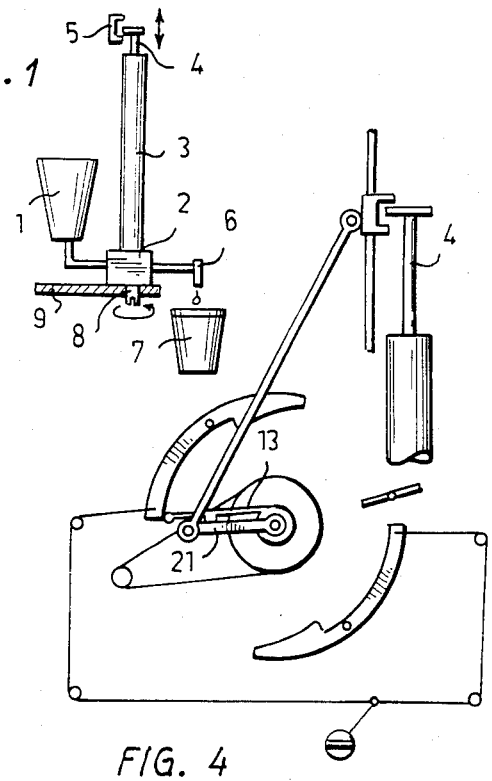
FIG. 1
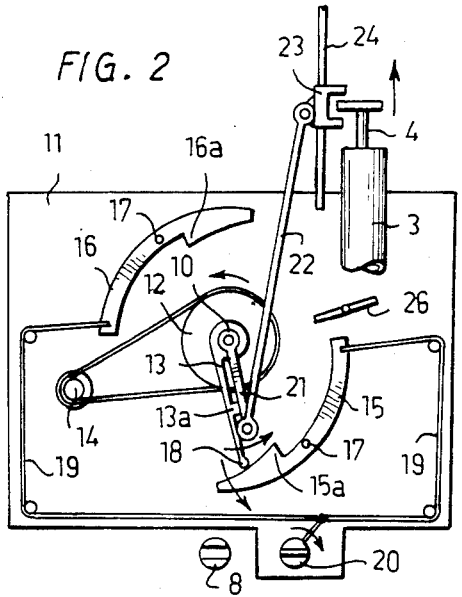
FIG. 2
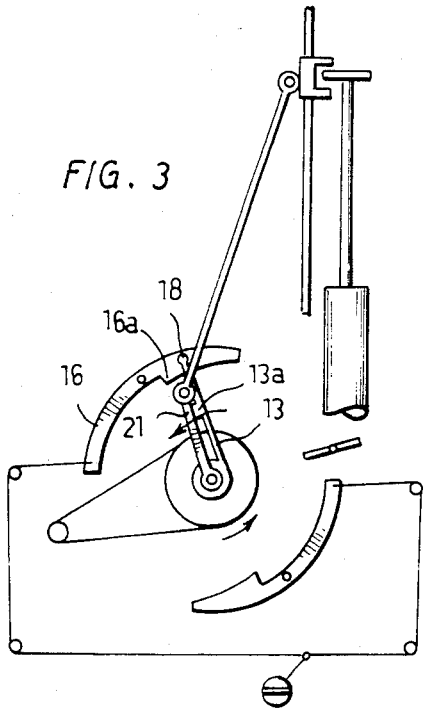
FIG. 3
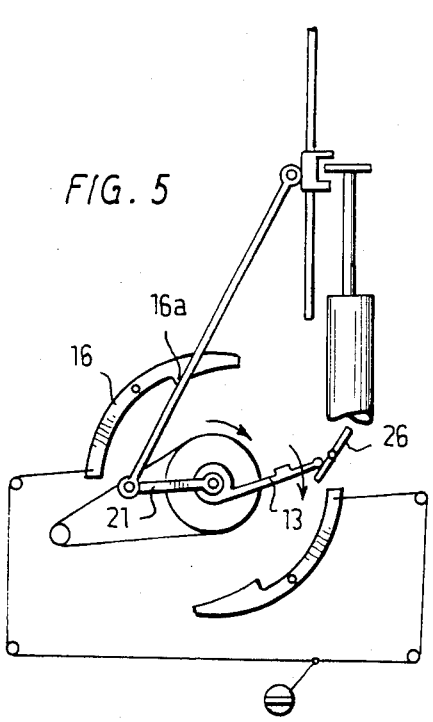
FIG. 4
FIG. 5

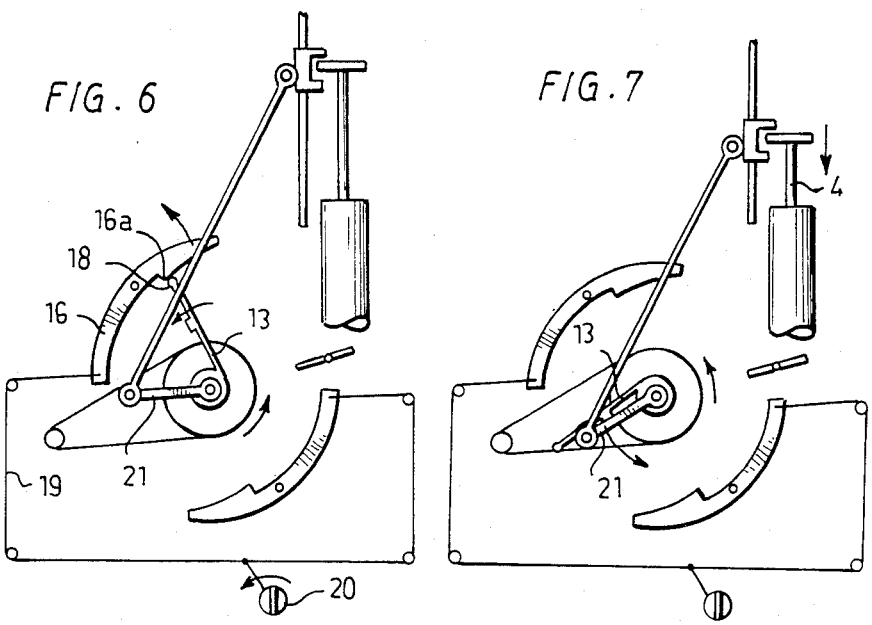
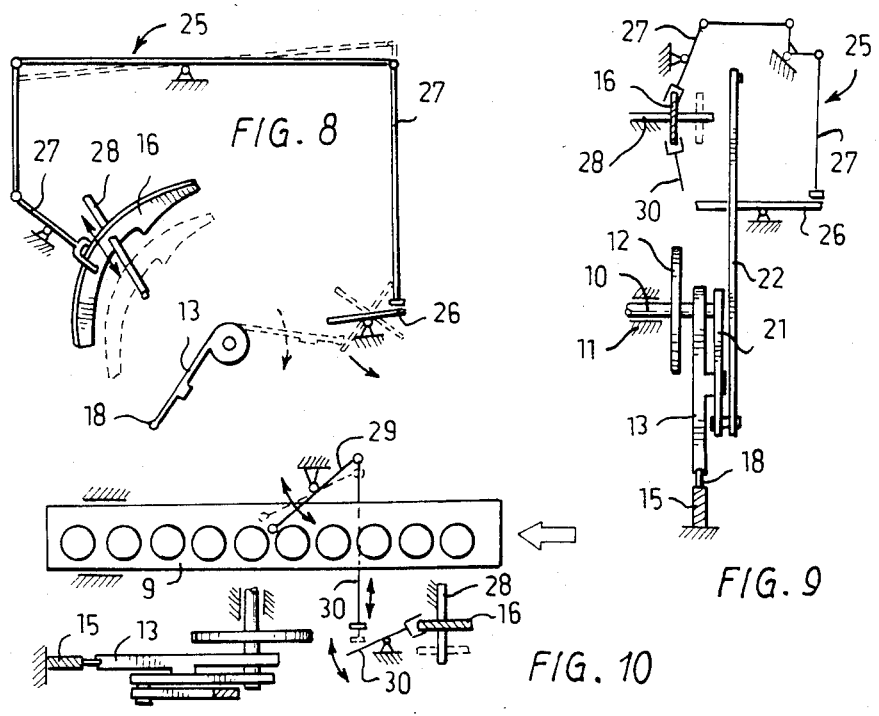

VALVE ACTUATOR FOR A DOSING PUMP FOR A PAINT TONING MACHINE

The present invention relates to a valve actuator for a dosing pump for a paint toning machine, wherein the dosing pumps are mounted in a sled movable with respect to the frame of the machine and a dosing device displacing the pistons of the dosing pumps and an actuator rotating the valves of the dosing pumps are mounted in the frame, said actuator being provided with a grab rotatable between a valve-closing position and a valve-opening position.

A paint toning machine comprises a plurality of containers for different toners, each of said containers being provided with a dosing pump of its own. The dosing pump is provided with a valve which in the suction position permits suction of a toner dose by means of the piston of the dosing pump from the container into the pump and which in the feeding position permits squeezing of the toner dose from the pump into a nozzle and further into the paint container to be toned. The operation of the valve is controlled by means of a valve actuator which in turn operates in synchronism with the dosing mechanism of the piston of the dosing pump.

The toner containers and the dosing pumps are mounted linearly or rotatably with respect to the frame on a movable sled, and one common dosing mechanism and one common valve actuating mechanism are mounted in the frame for all dosing pumps. The sled transfers to said mechanisms the dosing pump of the toner container which in each case is ready for dosing.

In previously known toning machines a separate electric motor is provided for the dosage mechanism and also a separate electric motor for the valve actuating mechanism. In addition to two motors, these machines require separate cables for each mechanism and special electronics for synchronizing the operation of both motors.

In a manually operated toning machine a construction has been previously used in which the piston of the dosing pump is displaced and the valve is rotated separately by manual power. Because such a construction permits a wrong timing of the movements of the valve and the piston or an otherwise faulty operation, special care and skill are required of the operator in order to achieve an accurate result.

The object of the present invention is to provide a valve actuator which eliminates the abovementioned disadvantages and permits the operation of both the dosing mechanism and the valve actuating mechanism by means of one power element and which, moreover, permits the use of inexpensive mechanical actuating means instead of electrical control means. This object is achieved by means of a valve actuator according to the invention which is characterized in that the actuator comprises a crank rotatably mounted in the frame, and two cam rods which are pivotally mounted in the frame and of which one is located in the path of movement of the crank and the other is provided with a transfer mechanism for transferring the cam rod optionally into and out of the path of movement of the crank, the cam rods being connected to the grab rotatably mounted in the frame so that the pivoting movement of one of the cam rods under the action of the crank causes rotation of the gripper to one of said positions and the pivoting movement of the other cam rod under the action of the crank causes rotation of the grab to the other one of said positions.

The invention is based on the idea of producing the rotary movement of the gripper between the valve-closing position and the valve-opening position by means of cam rods controlled by a rotating crank. When a crank-connecting rod shaft system based on rotary movement is used as dosing mechanism, the valve actuator and the dosing mechanism can be interconnected so as to produce the rotary movement required by the dosing mechanism by means of the rotary movement of the crank of the valve actuator. Both rotary movements can be simply interconnected and synchronized by means of mechanical means so that rotation of the valve always takes place while the dosing piston is stationary. Because of this, one power element, for example, an electric motor will be sufficient. Because only one power element is needed, the paint toning machine can also be made manually-operated when using the valve actuator according to the invention. Because of the transfer mechanism for one of the cam rods, the rotary movement of the crank of the valve actuator can first be utilized for moving the dosing piston and thereafter for moving a rotary slide whereby the switching from one operation to the other takes place entirely automatically by means of a simple reversal of the rotary movement. In a manually-operated toning machine, said construction and operating principle simplify and accelerate the dosing operation. A significant advantage in such a manually-operated machine as compared to the earlier ones is that a faulty operation by the operator and a resulting faulty toning are prevented.

The invention will be described in more detail in the following with reference to the accompanying drawings, in which FIG. 1 illustrates schematically the operating principle of a paint toning machine, FIGS. 2 to 7 illustrate the operating principle of one preferred embodiment of the valve actuator according to the invention, FIG. 8 shows the transfer mechanism for a cam rod of the actuator, FIG. 9 is an elevation of the valve actuator and the transfer mechanism, and FIG. 10 is a horizontal view of the transfer mechanism of the actuator.

In the toning machine according to FIG. 1, a toner container 1 is connected through a valve 2 to a dosing pump 3 into which a toner dose is sucked by displacing a piston rod 4 upwards by means of a gripper 5 included in the dosing mechanism. The valve is connected to a nozzle 6 into which the toner dose is pressed by displacing the piston rod downwards. The toner flows from the nozzle into a paint container 7. The operation of the valve is controlled by a rotary slide 8. The toner containers and the corresponding dosing pumps are mounted on a sled 9 reciprocable along guides which in this Figure are supported by a frame (not shown).

The valve actuating mechanism comprises a shaft 10 which is rotatably mounted in the frame 11 of the machine (FIG. 9) and on which a drive pulley 12 and a transfer crank 13 are fastened. The drive pulley is rotated by an electric motor 14. The actuator further includes two cam rods 15, 16 which are mounted on the opposite sides of the shaft and which are rotatably mounted in the frame by means of shaft pivots 17. Each cam rod is provided with cams 15a and 16a, respectively, located in the path of movement of a projection 18 in the transfer crank. Each cam rod is connected via a lever system 19 to a grab 20 driving the rotary slide.

The dosing mechanism comprises a dosing crank which is freely rotatably mounted on the shaft and mounted to a connecting rod 22 to which a gripper 23 is connected which actuates the piston rod 4 of the dosing pump by means of a fork having a rather large clearance. The gripper moves along a guide 24 fastened to the frame.

The assembly operates in the following manner:

Both cranks 13 and 21 are located in the basic position of the transfer device in the area of the lower dead point, as shown in FIG. 2. In this position, the projection 18 in the transfer crank presses the cam 15a away from the shaft 10 so that the cam rod 15 has via the lever system 19 rotated the grab 20 into the closing position. The piston rod of the dosing pump is then located in its lowermost position.

As the sled transfers the dosing pump to the transfer device for the valve, a handle in the grab 20 is pushed into a notch in the rotary slide 8. The motor is started and rotates the transfer crank 13 counterclockwise in FIG. 2. A carrier 13a in the transfer crank pushes the dosing crank 21 ahead of itself whereby the piston rod of the dosing pump moves upwards while sucking toner into the pump. When the projection 18 of the transfer crank arrives at the cam rod 16, this cam rod is located in the by-passing position so that the projection does not act on the cam 16a as the transfer crank reaches the upper dead point, as shown in FIG. 3.

As the transfer crank continues to rotate, the dosing crank 21 starts to pull the piston rod 4 of the pump downwards so that any excessive toner is under the action of the piston pushed back from the pump into the container. When the piston rod has moved downwards to a position where the desired toner dose remains in the pump, the electric motor stops. FIG. 4 illustrates such a position.

The motor immediately reverses its direction of rotation so that the transfer crank 12 starts to rotate clockwise. The dosing crank 21 remains in the position to which the transfer crank has transferred it. During its return movement, the transfer crank engages a shifting lever 26 which is included in the transfer mechanism 25 (FIGS. 8 to 10) and which is pivotally mounted in the frame. Due to this, the shifting lever pivots anti-clockwise in FIG. 5 and causes through the lever system 27 (FIGS. 8, 9) displacement of the upper cam rod 16 along a shaft 28 supported on the frame to such a position in which the cam 16a is located in the path of movement of the transfer crank.

Hereafter the electric motor reverses its direction of rotation so that the transfer crank 13 again rotates counter-clockwise. At the upper dead point the projection 18 of the transfer crank now acts on the cam 16a of the upper cam rod so that the cam pivots and through the lever system 19 rotates the grab 20 and thus also the rotary slide of the valve into the open position, as shown in FIG. 6.

As the transfer crank continues to rotate, it engages the dosing crank 21 and pushes it ahead of itself so that the piston rod 4 of the pump moves downwards and presses a toner dose through the nozzle into the paint container, as shown in FIG. 7.

When the transfer crank has reached the lower dead point and the entire toner dose has been fed from the pump into the nozzle, the projection 18 in the transfer crank again acts on the cam 15a of the lower cam rod so that the pivoting movement of the cam rod causes rotation of the grab 20 into a valve-closing position, as shown in FIG. 2. Due to the clearance of the gripper 23, the piston stays at the lower dead point during rotation of the valve. The pivoting of the rotary slide 8 of the valve thus takes place after the crank 13 has passed its lower and upper dead points at which moment the gripper 23 does not displace the piston rod because of the clearance of the gripper although the crank 13 still performs a small movement past the dead point.

If the toner dose to be dosed is bigger than one stroke of the piston rod of the pump, the transfer crank continues its movement over the required full revolutions. Then the projection 18 in the transfer crank first hits the shifting lever 26 which, when pivoting clockwise in FIG. 8, does not act on the lever system 27. Thus, the upper cam rod 16 still stays in the path of movement of the projection 18 in the transfer crank so that the cam rod displaces the grab 20 into the open position when the projection 18 pivots the cam rod 16. The transfer crank continues to rotate whereby the piston rod pushes a full toner dose from the pump into the nozzle. The transfer crank performs, without stopping, as many revolutions as the piston rod must pump full strokes and the motor thereafter stops the transfer crank in the basic position shown in FIG. 2.

After toning, the sled transfers the following dosing pump coming into question to the valve actuator whereafter the operation of the actuator and the dosing machine is repeated in the manner described above. The transfer mechanism 25 includes a return lever 29 which is pivotally mounted in the frame and connected by means of a lever system 20 to the upper cam rod 16. The tip of the return lever is located in the path of movement of the dosing pumps supported by the sled so that each pump forces the return lever to pivot as the sled transfers the pumps with respect to the valve actuator, as shown in FIG. 10. When the dosage described in connection with FIGS. 2 to 7 has been carried out and the sled transfers the following dosing pump to the dosing location, the pump pivots the return lever which through the lever systems displaces the upper cam rod 16 back to the position where it is away from the path of movement of the projection 18 in the transfer crank. This position is shown by solid lines in FIGS. 9 and 10.

The drawings and the description related thereto are only intended to illustrate the idea of the invention. In its details the valve actuator according to the invention may vary considerably within the scope of the claims.

What we claim are:

1. A valve actuator for a dosing pump for a paint toning machine, wherein the dosing pumps (3) are mounted in a sled (9) movable with respect to the frame (11) of the machine and a dosing device (21-24) displacing the pistons (4) of the dosing pumps and an actuator rotating the valves (8) of the dosing pumps are mounted in the frame, said actuator being provided with a grap (20) rotatable between a valve-closing position and a valve-opening position, characterized in that the actuator comprises a crank (13) rotatably mounted in the frame (11), and
two cam rods (15, 16) which are pivotally mounted in the frame and of which one is located in the path of movement of the crank and the other is provided with a transfer mechanism (25) for transferring the cam rod optionally into and out of the path of movement of the crank, the cam rods (15, 16) being connected to the grap (20) rotatably mounted in the frame so that the pivoting movement of one (15) of the cam rods under the action of the crank causes rotation of the grab to one of said positions and the pivoting movement of the other cam rod (16) under the action of the crank causes rotation of the grab to the other one of said positions.

2. An actuator according to claim 1, characterized in that the transfer mechanism (25) for the other cam rod (16) comprises a transfer lever (26) which is located in the path of movement of the crank (13) and is connected to said cam rod so that the pivoting movement of the transfer lever causes transfer of the cam rod to the path of movement of the crank.

3. An actuator according to claim 2, characterized in that the transfer mechanism (25) comprises a return lever (29) which is pivotally mounted in the frame (11) and located in the path of movement of the sled (9) and connected to the cam rod (16) so that the pivoting movement of the return lever under the action of the sled causes transfer of the cam rod out of the path of movement of the crank.

4. An actuator according to any of the preceding claims, whereby the dosing device (21–24) of the dosing pump (3) comprises a crank-connecting rod arm system, characterized in that the crank (13) of the actuator is mounted coaxially with the crank (21) of the dosing device, that the crank (13) of the actuator is connected to rotate with a power element (14) and the crank (21) of the dosing device is mounted rotatably with respect to the crank (13) of the actuator and that the crank (13) of the actuator is arranged to rotate the crank (21) of the dosing device along with itself when rotating in one direction but to release the crank of the dosing device when rotating in the other direction.

5. An actuator according to claim 4, characterized in that the dosing device (21–24) comprises a gripper (23) which is connected to the piston (4) of the dosing pump with an axial clearance so that the gripper is movable with respect to the piston to the extent of said clearance as the crank (13) of the actuator continues to rotate over its lower and upper dead point, respectively.

* * * * *